United States Patent [19]

Wright

[11] Patent Number: 4,672,488
[45] Date of Patent: Jun. 9, 1987

[54] SPINDLE HUB-DISC INTERFACE

[76] Inventor: Harold T. Wright, c/o Maxtor Corp., 150 River Oaks Pkwy., San Jose, Calif. 95134

[21] Appl. No.: 643,043

[22] Filed: Aug. 22, 1984

[51] Int. Cl.⁴ .............................................. G11B 5/012
[52] U.S. Cl. ...................................... 360/98; 360/135
[58] Field of Search ................. 369/270, 271; 360/86, 360/97, 98, 99, 133, 135; 248/DIG. 1; 411/544, 542, 531

[56] References Cited

U.S. PATENT DOCUMENTS

| | | | |
|---|---|---|---|
| 3,587,073 | 6/1971 | Ghose et al. | 360/98 X |
| 3,723,980 | 3/1973 | Gabor | 360/98 |
| 4,076,393 | 2/1978 | Bates | 248/DIG. 1 X |
| 4,125,883 | 11/1978 | Rolph | 360/99 |
| 4,176,519 | 12/1979 | Kronogard | 60/39.16 |
| 4,205,357 | 5/1980 | Barton et al. | 360/135 |

FOREIGN PATENT DOCUMENTS

| | | | |
|---|---|---|---|
| 482052 | 4/1929 | United Kingdom | 360/97 |
| 309931 | 3/1938 | United Kingdom | 360/97 |
| 1342495 | 1/1974 | United Kingdom | 360/97 |

OTHER PUBLICATIONS

Beck et al., "Hub Assembly for Flexible Disk Media" IBM Tech. Disc. Bull., vol. 19, No. 12 (May 1977).

Beck et al., "Flexible Disk Mounting Mechanism", IBM Tech. Disc. Bull., vol. 19, No. 6 (Nov. 1976).
Besha et al., "Disk Pack Compliance Clamp", IBM Tech. Disc. Bull., vol. 21, No. 2 (Jul. 1978).
Orlando, "Flexible Disk Structure", IBM Tech. Disc. Bull., vol. 19, No. 1 (Jun. 1976).

Primary Examiner—Stuart N. Hecker
Assistant Examiner—Benjamin E. Urcia
Attorney, Agent, or Firm—Blakely, Sokoloff, Taylor & Zafman

[57] ABSTRACT

To overcome problems of precise permanent location of aluminum Winchester discs relative to their steel drive spindle during temperature variations, in one form of the invention a plastic washer is placed between the disc and the underlying flange of the spindle. The washer maintains contact by static friction without slippage but is compliant with shear forces occasioned by temperature changes and, by reason of its elasticity, returns the members to their initial position when the original temperature is restored. In a second form of the invention, the steel flange is grooved to form a thin ring and the ring is slotted to provide flexible fingers on which the disc rests. These fingers likewise maintain permanent contact with the disc and are likewise compliant with changes in relative position occasioned by temperature variations, restoring the disc to original position relative to the spindle.

2 Claims, 4 Drawing Figures

SPINDLE HUB-DISC INTERFACE

BACKGROUND OF THE INVENTION

1. Field of the Invention

This invention relates to a new and improved Spindle Hub-Disc Interface for use in hard disc computer drives commonly known as Winchester Disc Drives. More specifically the invention relates to means interposed between one of the discs and the flange of the spindle which rotates the discs insuring that when the members expand and contract responsive to temperature changes the said disc returns to its initial position relative to the spindle when the original temperature is restored.

2. Description of Prior Art

Winchester disc drives of the general type with which the present invention is used are well known in the computer industry. Servo information is commonly recorded on the bottom surface of the lowermost disc. Other information is recorded on the other surface of the lowermost disc and both surfaces of the superimposed discs. To insure that the read-write heads which record and read information on the other discs function properly, it is extremely important that the lowermost disc be accurately located despite problems of expansion and contraction of the different materials of which the discs and the spindle which drives the discs are composed. Heretofore no practical means has been achieved for insuring such accuracy.

OBJECT OF THE INVENTION

It is, accordingly, a principal feature of the present invention to provide consistent radial positioning of the servo disc despite the differential expansion between the spindle hub and such disc which causes relative motion between such material.

Accordingly in one form of the invention, a material of low modulus high tensile strength is placed between the servo disc and the flange of the hub on which it rests. The material takes up the relative motion between the two members and because of its elasticity consistently positions the members in a radial sense.

In one form of the invention, an annular ring (herein "washer") is placed on the flange of the spindle so that the inner portion of the servo disc rests thereon. The washer frictionally engages both the disc and the spindle hub. When there is relative movement of the two members because of their different coefficients of expansion, such movement results in a shear stress applied to the washer. By reason of the elasticity of the washer, when the differential expansion is relieved, the washer causes the disc and spindle flange to resume initial position.

In another form of the invention, the surface of the flange is cut away so that it is very thin and, in fact may be vertically slotted. The top edge of the flange is thus very thin and flexible and frictionally engages the disc to perform essentially the same function as the washer heretofore described.

SUMMARY OF THE INVENTION

In one embodiment a thin disc of a material such as MYLAR formed in a washer is placed on the top of hub flange and bears against the inside of the servo disc which rests thereupon. The washer elastically takes up relative motion between the disc and the flange occasioned by temperature changes and the different coefficients of expansion of the disc and flange. Hence the disc is restored to its initial position when the temperature is restored.

In another aspect of the inventions, the top surface of the flange of the hub is made exceedingly elastic. Thus the top edge thereof engages the disc frictionally so that relative expansion and contraction of the two parts is accommodated by the elasticity of the thin rim of the flange. To overcome "hoop effect" vertical slots may be cut extending down from the top surface of said rim.

Other objects of the present invention will become apparent upon reading the following specification and referring to the accompanying drawings in which similar characters of reference represent corresponding parts in each of the several views.

IN THE DRAWINGS

DETAILED DESCRIPTION OF PREFERRED EMBODIMENTS

Figure 1:
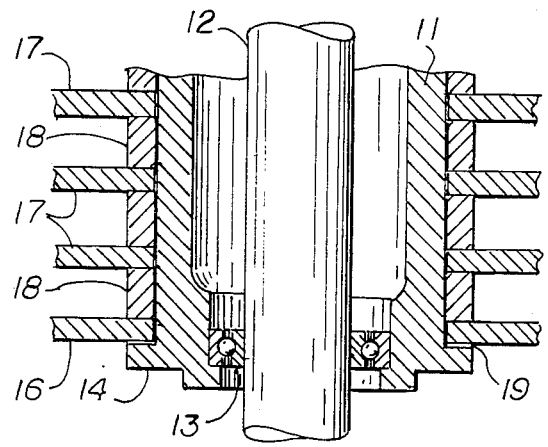
FIG. 1 is a vertical sectional view through a portion of a spindle, hub and disc.

Shown more or less schematically in FIG. 1 are elements of the Winchester disc drive, wherein a hub 11 of steel or other ferrous material is caused by means not shown but well understood in the art to rotate about a shaft 12 with bearings 13 interposed. A peripheral flange 14 is formed on the bottom of spindle hub 11. Normally resting upon the hub 14 is a lowermost disc 16, hereinafter referred to as the servo disc, because servo drive mechanism data is recorded on its bottom surface. Other discs 17 are spaced above disc 16 and are separated by spacer rings 18. The substrates of discs 16, 17 and the spacers 18 are commonly of aluminum. As the hub 11 is caused to rotate, the discs 16, 17 rotate therewith. To accommodate the different coefficients of expansion of the discs and the spindle hub 11, a slight gap (best shown in FIG. 2) occurs between the inner edge of the discs 16, 17 and the outer diameter of the hub 11.

Drives of this type are commonly operated in a range of 4° to 50° C. The tracks on the discs are commonly about 0.65 mils and the pitch between the tracks is commonly 10 mils. The difference between the coefficient of expansion of the aluminum and steel is approximately 5 micro inches per inch per degree Fahrenheit. Thus, the discs expand at a greater rate than the hub with the increase in temperature, and as the temperature decreases may come back to a different position. In such instance, the servo information is out of synchronism with the recorded information on the other discs.

Figure 2:
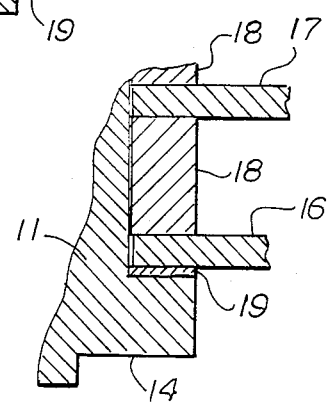
FIG. 2 is a fragmentary enlarged view of a portion of FIG. 1.

The solution to the problem in the form of the invention shown in FIGS. 1 and 2 is the provision of a washer 19 of MYLAR about 10 mil thick, placed on the top of flange 14 under the inner edge of the disc 16. The bottom surface of the washer 19 frictionally engages the flange 14 and the upper surface frictionally engages the disc 16. Hence, the washer 19 is placed in shear forces occasioned by the differential expansion of the two members. The washer 19 acts as a compliant member and never breaks static frictional engagement, hence there is no relative slippage between the disc and the flange of the hub, despite the movement therebetween.

MYLAR is a preferred material because of its low modulus of elasticity, and high tensile strength. Its coefficient of expansion is approximately that of an aluminum disc, but this is not essential since the coefficient of the washer should be somewhere between that of the disc and the flange.

Figure 3:
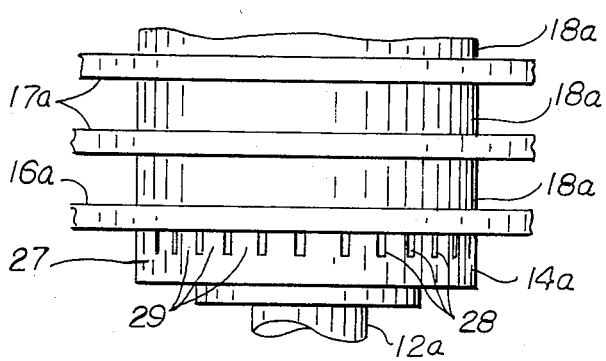
FIG. 3 is a fragmentary side elevational view of a modification.
Figure 4:
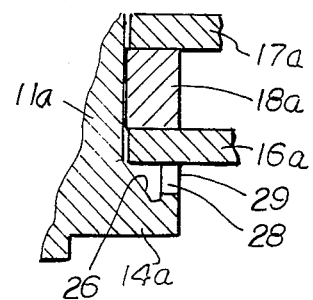
FIG. 4 is an enlarged fragmentary sectional view similar to FIG. 2 of the modification of FIG. 3.

In the modification shown in FIGS. 3 and 4, a groove 26 is cut in the top surface of the flange 14a of the hub 11a, leaving a narrow annular rim 27 at the outside of the flange 14a. Such a rim 27 is very flexible, but to improve its flexibility, a plurality of slots 28 are cut in the rim 27 extending down from the top edge thereof, forming fingers 29 between the slots 28. Such fingers are extremely flexible. The top edges of fingers 29 engage the bottom inner edge of servo disc 16a. The slots 28 relieve hoop stress.

With changes in temperature, the fingers 29 flex inward and outward, always maintaining frictional contact with the servo disc 16a and hence returning the disc 16a to its initial position.

In other respects the modification of FIGS. 3 and 4 resembles that of FIGS. 1 and 2 and the same reference to numerals followed by the subscript a represent corresponding parts.

What is claimed is:
1. A hub-disk apparatus for use in Winchester type hard disk drives comprising:
   a hub for rotatably supporting a multiplicity of annular disks arranged in a stack thereon;
   a peripheral flange integral with said hub extending about the periphery thereof;
   rim means for supporting the lowermost disk of said disks arranged in a stack and extending upwardly from said peripheral flange, said rim means including a multiplicity of upwardly extending fingers spaced above said peripheral flange and integral therewith, the lower surface of said lowermost disk being frictionally engaged with the upwardly facing surface of said upwardly extending fingers, wherein said fingers flex inwardly and outwardly in a direction substantially perpendicular to the longitudinal axis of said hub in response to differential thermal expansion between said hub and said lowermost disk.
2. The apparatus as claimed in claim 1 wherein said fingers are equally spaced apart along said peripheral flange means.

* * * * *